United States Patent [19]
Simmons et al.

[11] 4,017,784
[45] Apr. 12, 1977

[54] DC TO DC CONVERTER

[75] Inventors: David Harry Simmons, Palo Alto; Paul Calvin Launderville, Redwood City, both of Calif.

[73] Assignee: Litton Systems, Inc., San Carlos, Calif.

[22] Filed: May 17, 1976

[21] Appl. No.: 686,797

[52] U.S. Cl. .................................. 321/2; 321/45 R
[51] Int. Cl.² ........................................ H02M 3/335
[58] Field of Search .................. 321/2, 18, 45 R

[56] References Cited
UNITED STATES PATENTS

| | | | |
|---|---|---|---|
| 3,290,581 | 12/1966 | Hooper | 321/45 R |
| 3,327,200 | 6/1967 | Corey | 321/18 X |
| 3,504,264 | 3/1970 | Suelzle | 321/45 R X |
| 3,683,263 | 8/1972 | Fender | 321/45 R |

Primary Examiner—William M. Shoop
Attorney, Agent, or Firm—Ronald M. Goldman

[57] ABSTRACT

The DC to DC converter contains a transformer, having a primary and a secondary winding and a predetermined leakage reactance existing between the primary and the secondary winding. A rectifier circuit is connected to the secondary and a large filter capacitance is connected to the rectifier to form an output across the filter capacitor adapted for connection to a load. A pair of electronic switches are connected across the input to the converter in series with the primary. A capacitor is included in series with the primary and voltage clamping diodes are coupled to the capacitor to prevent voltage across same from exceeding the input voltage level. Pulse generating means coupled to the load, monitor the load voltage level and provide suitable pulses alternately to said electronic switches so as to cause same to alternately conduct current through the capacitor and through the primary. Suitably the capacitive reactance of the capacitance bears a proper relationship to the leakage reactance of each secondary to effect a half sinusoid shaped current waveform through the primary during the operation of each switch. And as a function of the load voltage the periodicity of the pulses applied to the switches by the pulse generating means is increased or decreased.

5 Claims, 14 Drawing Figures

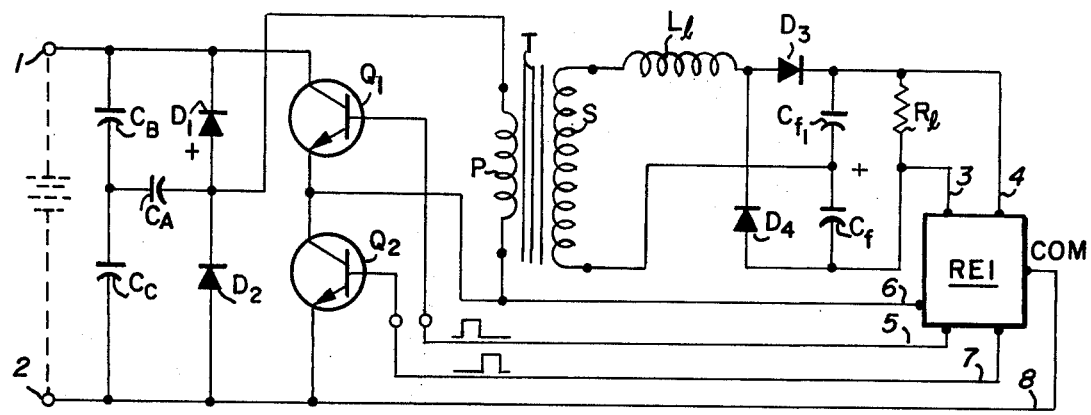
Fig_1
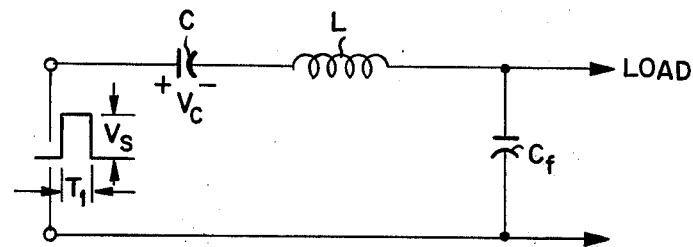
Fig_2
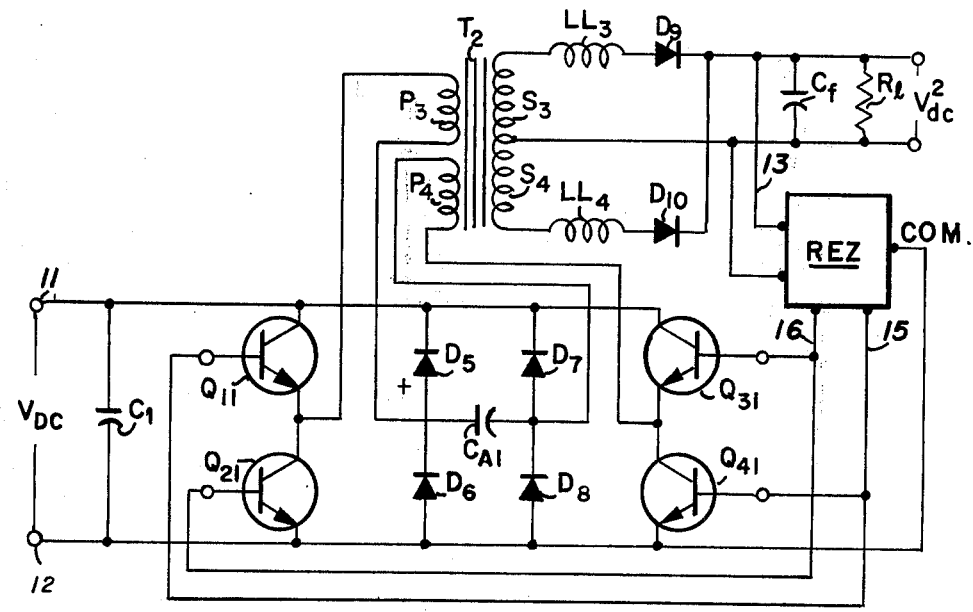
Fig_3

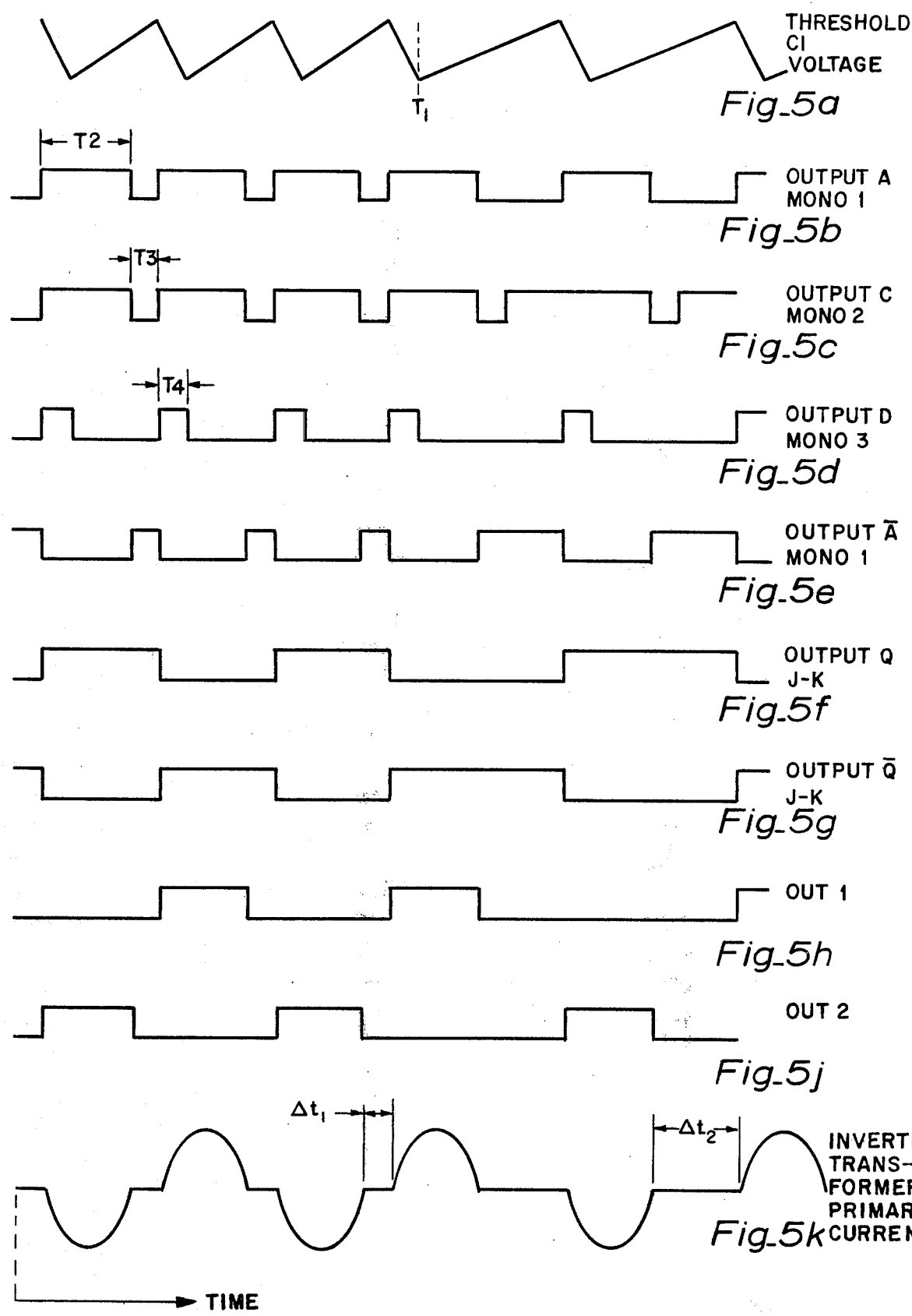

DC TO DC CONVERTER

BACKGROUND OF THE INVENTION

This invention relates to DC to DC converters and, more particularly, to a DC to DC converter in which the output voltage may be regulated against variations in input voltage and output current. A DC to DC converter, as is known, converts the DC voltage provided by a DC source at an input to a voltage level different from that of the DC source applied at an output. By way of example, this type of voltage-converting device finds application as part of traveling wave tube amplifier systems where a low voltage DC source must be converted to one or more high voltage DC sources suitable to operate the electrodes of a traveling wave tube.

One design of converter which has been heretofore employed in such a traveling wave tube amplifier system uses a transformer having a primary and a center tapped secondary, with the secondary winding ends connected through rectifiers and connected in series with a large inductor for connection to one end of a load between the inductor and the secondary winding tap and with a pair of switches, such as transistor switches, connected in series circuit to alternate ends of the input, with one end of the primary winding connected to the juncture of the two transistor switches and the other end of the primary winding connected to the juncture of a series connected pair of capacitors connected across the input, with means responsive to the low voltage for varying the periodicity of control pulses alternately applied to the transistors. A sophisticated example of this type of circuit of which we have knowledge appears in U.S. Pat. No. 3,745,440 to Lord, owned by the assignee of the present invention. In the aforedescribed circuit, to an approximation, the current into the transformer primary is of a ramplike waveform; the current increases linearly in level with lapse of time to a predetermined maximum and then abruptly terminates. The output voltage is controlled by means varying the ratio of the on time of the transistor switches to the time of a half cycle. It is recognized that the inductor used in such device is bulky and heavy. Moreover, as a result of the ramp shaped waveform of the primary current, the peak current through the transistor switches is at least twice the average current. This limits the peak power which can safely be handled by the device because of current and voltage limitations on presently available transistors. Additionally, the transistor must switch from a current-conducting or "on" state to a noncurrent conducting or "off" state at a time when its collector current is at the highest level. Thus a good deal of power is dissipated in the transistors during the interval in which the transistor is turned off. Furthermore, an undesirable side-effect of the fast rise and fall of current in the operation of the aforedescribed prior art circuit, the converter generates levels of high frequency electromagnetic energy that could cause interference. By way of further background, there has been made known to us a voltage converter design presented in U.S. Pat. No. 3,582,754 to Hoffman et al. Hoffman discloses a DC to DC converter that is self-oscillatory but which does not contain any structure to vary the width or the duty cycle of his primary currents. The converter in the Hoffman patent shows the use of a capacitor which in conjunction with an inductance produces half sinusoids of current in a transformer primary and in which the leakage reactance existing between the primary and secondary winding is used as the inductance. And lastly, the Hoffman converter shows the use of a pair of series connected diodes to clamp the peak voltage excursion at one location, not directly across the capacitor, within the circuit as is brought out in the patent. The Hoffman circuit is intrinsically nonregulating and line voltage regulation is achieved by the use of "add-on" devices. As becomes apparent hereinafter, although he circuit of Hoffman contains features which are similar to the structure found in the present invention, the arrangement and cooperation of elements differs and achieves a different result.

The present invention has as an object the provision of a high power DC to DC converter that is less bulky, more efficient and capable of handling greater amounts of power than previous designs actually employed and which, moreover, can be regulated over a wide range of input voltages and load conditions.

It is a further object of the invention to provide a high power DC to DC converter particularly adapted for use in traveling wave tube amplifier circuits without the necessity of a heavy bulky inductor and which incorporates a regulating feature of relatively uncomplicated structure.

SUMMARY OF THE INVENTION

Our novel DC to DC converter includes a capacitor; a transformer containing primary and secondary windings, with the secondary loosely coupled to the primary to provide a predetermined amount of leakage inductance between secondary and primary; a rectifier means is included for connection to the winding ends and a load; and a large filter capacitor is connected across the output of the rectifier means. The transformer primary is coupled in series connection with the primary capacitor and a pair of transistor switches are so connected that they may pass current through the capacitor and the primary winding in series. The switches are arranged so that one conducts current in a first direction and the other conducts current in a second direction through the primary. Clamping diode means are coupled to the capacitor to prevent the voltage across the capacitor from exceeding the input voltage level. The capacitance of the capacitor bears a relationship to the leakage inductance of the transformer so that when either of the transistor switches is in a current-conducting condition the resultant current is of the waveform of a half sinusoid. Additionally, a pulse generating means coupled to the load monitors the load voltage and provides appropriate pulse outputs to the transistor switches at a rate which is a function of the load voltage, whereby if the load voltage is excessive a periodicity of operation of the switches is reduced so as to produce a wider spacing in time between the current pulses flowing through the primary winding.

The foregoing objects and advantages of the invention as well as the structure characteristic of the invention is better understood by making reference to and considering the detailed description of the preferred embodiments of the invention which follows taken together with the illustrations of the drawings.

BRIEF DESCRIPTION OF DRAWINGS

In the drawings:

FIG. 1 illustrates a preferred embodiment of the invention in partial electrical schematic form and partial block diagram;

FIG. 2 illustrates an equivalent circuit diagram of a portion of the embodiment of FIG. 1;

FIG. 3 illustrates a second embodiment of the invention in a DC to DC converter;

FIGS. 5a-5k graphically illustrates exemplary waveforms of voltages and currents occurring in the operation of the regulator of FIG. 4.

DESCRIPTION OF THE PREFERRED EMBODIMENTS

Figure 4:
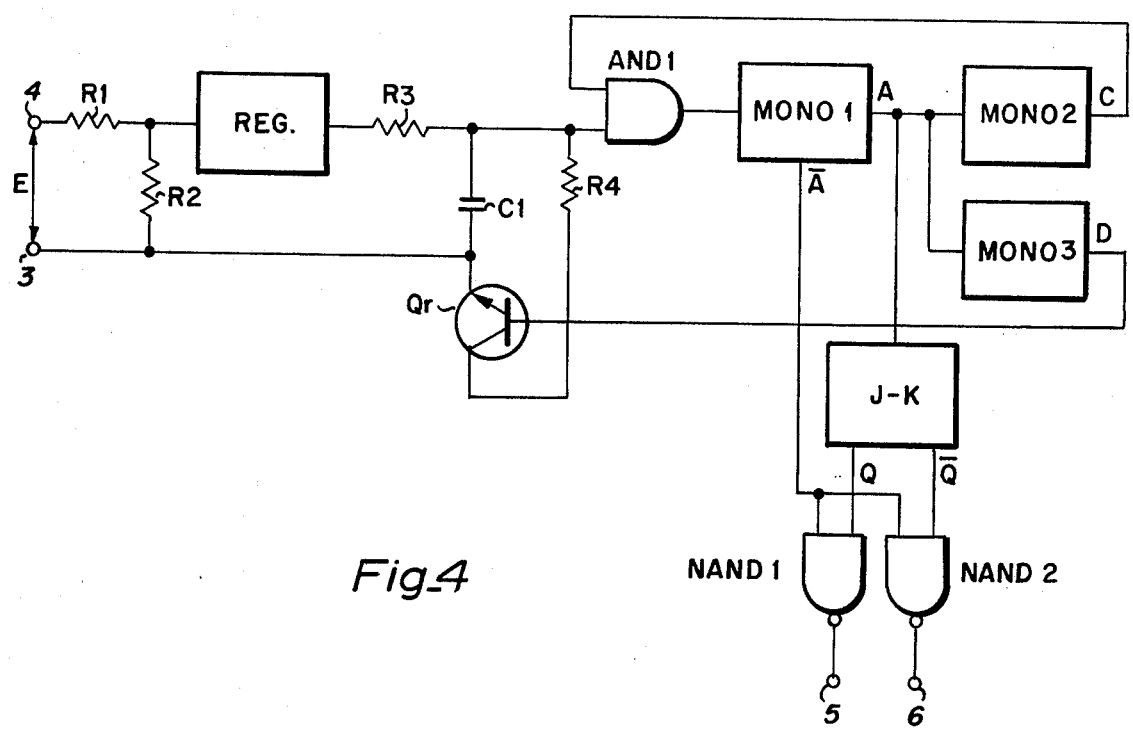
FIG. 4 illustrates a block diagram form, a regulator circuit useful in the preceding embodiments.

The embodiment of FIG. 1 includes capacitors $C_A$, $C_B$, $C_C$, diodes $D_1$ and $D_2$, transistors $Q_1$ and $Q_2$, transformer T containing a primary P and a secondary winding S of a familiar construction in which the primary and secondary are "loosely coupled" magnetically, and the resulting primary to secondary leakage inductance is illustrated as a discrete series connected inductance LL. The embodiment further includes rectifier diodes $D_3$ and $D_4$, filter capacitors $C_{f1}$ and $C_{f2}$, load $R_l$, represented as a resistance, and regulator $RE_1$, which is represented in block diagram form. The symbols representative of all of the known devices and elements included in this circuit are well understood by those skilled in the art. As is illustrated, filter capacitor $C_{f1}$ is connected to a first end of secondary S and to the cathode end of diode $D_3$. The anode end of $D_3$ is in turn connected to the remaining end of secondary S. Capacitor $C_{f2}$ is connected to the first end of secondary S and to the anode end of diode $D_4$. The cathode end of $D_4$ is connected to the remaining end of secondary S. The load $R_l$ is connected across the series combination of $C_{f1}$ and $C_{f2}$. This is the well-known full-wave doubler rectifier circuit in which two series circuits of diode and capacitor are connected in parallel across a transformer secondary. The rectifier is shown as a full-wave doubler for convenience, and because this is a suitable configuration where a high voltage output is required. The converter is also well adapted to the use of a center-tapped full-wave rectifier circuit, a bridge rectifier, or other well-known rectifier filter configuration. Transistor $Q_1$ and $Q_2$, both of the NPN type, are connected with their collector and emitters in electrical series circuit across converter input 1 and 2. And capacitor $C_B$ is connected in series circuit with capacitor $C_C$ across inputs 1 and 2. Diode $D_1$ is connected in series with diode $D_2$ across input 1 and 2 with the diodes electrically poled in the same direction and the anode of diode $D_2$ connected to input terminal 2. Capacitor $C_A$ is connected at one end to the circuit juncture between capacitors $C_B$ and $C_C$ and at its other end to the juncture between the cathode of diode $D_2$ and the anode of diode $D_1$. The circuit juncture between the diodes is likewise connected to one end of primary P. The remaining end of primary P is connected in common circuit with the collector of $Q_2$ and the emitter of $Q_1$. Inputs 3 and 4 of regulator $RE_1$ are connected across the load $R_l$ and circuit commons are connected via leads 6 and 8 to the respective emitters of transistors $Q_1$ and $Q_2$. The outputs of regulator $RE_1$, 5 and 7, are connected to a respective one of the bases of transistors $Q_1$ and $Q_2$. Regulator $RE_1$ supplies voltage pulses, alternately, to the base of transistor $Q_1$ and then transistor $Q_2$ and repeats that output sequence at a rate or periodicity dependent upon the voltage across inputs 3 and 4.

In operation, a DC voltage of a predetermined level is applied across terminals 1 and 2 with the positive polarity at terminal 1. From that source of voltage, capacitors $C_B$ and $C_C$ receive an electrical charge and, inasmuch as capacitor $C_B$ is of the same capacitance value as capacitor $C_C$, the voltage divides evenly across the capacitors with one-half the voltage level across each. A first output pulse from regulator $RE_1$ is applied via lead 5 to the base of transistor $Q_1$ and transistor $Q_1$ switches from a noncurrent-conducting state to a current-conducting state for the duration of that base input pulse. Current thus flows in a path from terminal 1, collector and emitter of $Q_1$, primary P through capacitor $C_A$ and capacitor $C_C$ back to the source through terminal 2. As more particularly described hereinafter, the waveshape of the current is that of a half sinusoid inasmuch as the capacitance of $C_A$ is matched to the leakage inductance LL of transformer T. Regulator $RE_1$ terminates the input pulse to the base of $Q_1$ and after a predetermined interval applies a voltage pulse over lead 7 to the base of transistor $Q_2$. Upon removal of the pulse from the base of $Q_1$, $Q_1$ restores to its nonconducting state. Conversely, with the application of the pulse to the base of $Q_2$, $Q_2$ switches into its current-conducting condition for the duration of that input pulse. In so doing, current flows in a path from input terminal 1, capacitor $C_B$, capacitor $C_A$, one end of primary P through the collector and emitter of transistor $Q_2$ and back to the source over input terminal 2. The current in this instance flows through primary winding P in a direction opposite to the direction of current passed by transistor switch $Q_1$. However, the current waveshape is likewise a half sinusoid inasmuch as capacitor $C_A$ is matched to leakage inductance LL. At the conclusion of pulse on the base of $Q_2$, $Q_2$ restores to its noncurrent-conducting condition and current through primary P ceases.

After a predetermined interval the regulator applies another pulse over lead 5 to the base of $Q_1$ and the entire process is repeated. Effectively, an AC current is produced in primary P which induces through transformer action a voltage in the secondary winding. When the voltage at the upper end of winding S is positive relative to the lower end, current flows through secondary S, diode $D_3$ to charge capacitor $C_{f1}$. Similarly, when the lower end of secondary S is positive relative to the upper end, current flows through diode $D_4$ to charge the filter capacitor $C_{f2}$. The voltages to which the capacitors $C_f$ and $C_{f2}$ are charged are additive. Hence, the voltage presented to load $R_l$ is the sum of the voltages on the capacitors.

Referring again to capacitor $C_A$ and the associated diodes $D_1$ and $D_2$, it is apparent that if the voltage at the anode end of diode $D_1$ begins to exceed the voltage at input 1, $D_1$ conducts current. Hence the voltage across $C_A$ on one-half cycle cannot exceed that on $C_B$ and the diodes serve to "clamp" the voltage across $C_A$. Similarly if the voltage at the end of $C_A$ is of a level and of negative polarity which attempts to exceed the voltage level of $C_C$, diode $D_2$ conducts to prevent this circuit juncture from exceeding the voltage level across $C_C$. The diodes thus act as a voltage clamping circuit and serve a function in the combination that becomes more apparent from the following description. The voltage across load $R_l$ is monitored via leads 3 and 4 by regulator $RE_1$. In the preceding description it is assumed that the load voltage is of a predetermined level and a certain pair of pulses were alternately applied to leads 5 and 7, each of a predetermined duration, and repeated after a predetermined interval of time $T_2$. The regulator circuit includes a means to relate the input voltage level with the repetition rate at the output of regulator $RE_1$ through conventional circuitry. As the voltage across the load increases above the desired level the regulator reduces the periodicity of the output pulses. Conversely, as the output voltage lowers from the desired level the output increases. With increased frequency the quantity of energy induced in the secondary windings increases to increase the voltage and with reduced periodicity the quantity of energy in the secondary is reduced. As becomes clear from the analysis of the circuit, such a result is not possible without the clamping diodes $D_1$ and $D_2$. Considering a mathematical equivalent circuit presented in FIG. 2, the mode of operation may be analyzed by those skilled readers familiar with this type of device. The equivalent circuit shows a voltage pulse of amplitude $V_s$, equal to the secondary voltage appearing between the ends of secondary S of transformer T, and of a duration $T_1$ applied to a series circuit consisting of capacitor C, equivalent to capacitor $C_A$ of FIG. 1, and inductor L equivalent to the leakage inductance LL in FIG. 1, and the output filter capacitor $C_f$ which in the steady state condition described is charged to the desired output voltage $V_o$. In the analysis that follows it is assumed that the filter capacitor $C_f$ is substantially larger than capacitor C so that the output voltage $V_o$ may be assumed to be constant during the duration of input voltage pulse $V_s$. The instantaneous current through the circuit may be written as:

$$i = \left(\frac{V}{\sqrt{L/C}}\right) \sin\left(\frac{t}{\sqrt{LC}}\right) \quad (1)$$

where $i$ is the instantaneous current at time $t$, a variable, and $V_c$ is the voltage on capacitor C at the time of application of voltage pulse $V_s$. The voltage $V$ is defined by the following equation:

$$V = V_s - V_c - V_o \quad (2)$$

From Equation 1 it is seen that:

$$\int_0^{T_1} i\, dt = \frac{V}{\sqrt{L/C}} \int_0^{T_1} \sin\frac{t}{\sqrt{LC}}\, dt = V \cdot C \left[1 - \cos\left(\frac{T_1}{\sqrt{LC}}\right)\right] \quad (3)$$

If $\Delta V_c$ is the overall change in $V_c$ during the application of the voltage pulse then:

$$\Delta V_c = \frac{1}{C} \int_0^{T_1} i\, dt = V\left[1 - \cos\left(\frac{T_1}{\sqrt{LC}}\right)\right] \quad (4)$$

$$V_c = -\tfrac{1}{2} \Delta V_c = -\frac{V}{2}\left[1 - \cos\left(\frac{T_1}{\sqrt{LC}}\right)\right] \quad (5)$$

In the case where the duration of pulse $V_i$ is $T_i$ in which $T_1$ equals $\pi \times \sqrt{LC}$, which characterizes the condition for a complete half sinusoid of current, Equation 5 becomes $V_c = -V$ and Equation 2 reduces to:

$$V_s = V_o \quad (6)$$

In practice the relationship defined by Equation 6 means that the output voltage of the converter appearing across the load must be equal to twice the secondary voltage of transformer T which, in turn, is equal to the voltage applied across the converter input multiplied by the turns ratio of transformer $T_1$ if the primary current is allowed to complete a half sinusoid. From the foregoing the conclusion is that the circuit cannot be regulated; that is, the output voltage cannot be regulated as a function of changing input voltage by changing the time $T_2$ since the output voltage as given in Equation 6 is not functionally dependent on the time $T_2$. That conclusion is correct if the change of voltage on capacitor C is not restricted. In that event, if the time $T_2$ is increased, the voltage $V_c$ and the current $i$ increase as the input voltage is increased, in such a way that the output voltage remains proportional to the secondary voltage (or to the input voltage) as predicted by Equation b. The voltage swing on capacitor $C_1$ is however restricted. The diodes $D_1$ and $D_2$ in the embodiment of FIG. 1 serve this purpose. The relationship defined by Equation 6 is thus no longer valid and the circuit can be regulated against input voltage changes by simply changing $T_2$.

Reference is now made to another embodiment of the invention illustrated in FIG. 3. In this figure a transformer $T_2$ includes a center tapped secondary winding including secondary winding half $S_3$ and winding half $S_4$, and a pair of primary windings $P_3$ and $P_4$ isolated electrically from one another. This is a transformer of a conventional high reactance type in which the secondary windings are "loosely coupled" to the primary. The primary to secondary leakage inductance of transformer $T_2$ is represented as a discrete inductance in series with the secondary winding, specifically leakage inductance $LL_3$ and leakage inductance $LL_4$ associated with secondary windings $S_3$ and $S_4$, respectively. Four transistor switches $Q_{11}$, $Q_{21}$, $Q_{31}$ and $Q_{41}$, four diodes $D_5$, $D_6$, $D_7$ and $D_8$, a capacitor $CA_1$ and a second capacitor $C_1$, rectifier diodes $D_9$ and $D_{10}$, filter capacitor $C_f$ and a load represented as resistor $R_l$ are included. A regulator $RE_2$ has an input connected via leads 13 and 14 across the load for monitoring load voltage. $RE_2$ has four outputs, each of which drives the base emitter junction of one of the transistors $Q_{11}$, $Q_{21}$, $Q_{31}$, $Q_{41}$. These outputs are so arranged that $Q_{11}$ and $Q_{41}$ are both on or both off together, and $Q_{21}$ and $Q_{31}$ are both on and off together. Transistors $Q_{11}$ and $Q_{21}$ are connected electrically in series across input 11 and 12. Similarly transistors $Q_{31}$ and $Q_{41}$ are connected in series across inputs 11 and 12. Diodes $D_5$ and $D_6$ are connected in the same polarity direction in series across the input with the cathode end of $D_5$ connected to input 11 and diodes $D_7$ and $D_8$ are connected in the same polarity direction series across the input with cathode polarity end of $D_7$ connected to input 11. The capacitor $CA_1$ is connected between the circuit juncture of one series connected diode and the juncture of the other series connected diodes. Primary $P_3$ is connected in series between the juncture of transistors $Q_{11}$ and $Q_{21}$ and the juncture of diodes $D_5$ and $D_6$. Primary winding $P_4$ is connected in series between the juncture of diodes $D_7$ and $D_8$ and the juncture of transistors $Q_{31}$ and $Q_{41}$. One end of secondary winding $S_3$ is connected in series with diode $D_9$, poled as illustrated, to one end of capacitor $C_f$ and the load. One end of secondary winding $S_4$ is connected in series with diode $D_{10}$ to the same end of capacitor $C_f$ and the load. The secondary circuit formed is that of the conventional full wave rectifier circuit. For convenience, this rectifier is shown as a full wave, center-tapped configuration. The converter is also well adapted to the use of a bridge rectifier, voltage multiplier, or other well-known rectifier-filter configuration.

The operation of the embodiment of FIG. 3 is similar to that of FIG. 1. The input DC voltage is applied across input terminals 11 and with its positive polarity at terminal 11. Initially all of transistor switches $Q_{11}$ through $Q_{41}$ are in the noncurrent-conducting condition. Regulator $RE_2$ provides a pulse to the bases of transistors $Q_{11}$ and $Q_{41}$ and those transistors switch into the current conducting condition. Current flows from input 11 through transistor $Q_{11}$, primary winding $P_3$, capacitor $CA_1$, primary winding $P_4$, transistor $Q_{41}$ and back to the source over terminal 12. At the conclusion of the base pulse from $RE_2$, transistors $Q_{11}$ and $Q_{41}$ restore to their nonconducting state. Inasmuch as the capacitor $CA_1$ is matched to the leakage inductance of transformer T the current during the operation of transistors $Q_{11}$ and $Q_{41}$ is a half sinusoid in waveshape. The regulator then applies a pulse to the bases of transistors $Q_{21}$ and $Q_{31}$. Current flows from terminal 11 through transistor $Q_{31}$, primary $P_4$, capacitor $CA_1$, primary $P_3$, transistor $Q_{21}$ and back to the source over terminal 12. Again the current waveshape is a half sinusoid and the current passes through windings $P_3$ and $P_4$ in a direction opposite to the direction of current during operation of transistors $Q_{11}$ and $Q_{41}$. The voltage across the primary is transformed to a voltage across the secondary, equal to the primary voltage times the turns ratio between the primary and secondary windings, and the secondary and rectifiers $D_9$ and $D_{10}$ operate as a full wave rectifier, identical to that in FIG. 1, to supply a voltage across capacitor $C_f$ and load $R_l$. Diodes $D_5$ through $D_8$ serve to clamp or limit the voltage across capacitor $CA_1$ and perform the same function as diodes $D_1$ and $D_2$ in FIG. 1. Thus if the voltage across $CA_1$ appearing at the juncture of diodes $D_7$ and $D_8$ attempts to become more positive than the voltage at terminal 11, diode $D_7$ conducts current to limit this voltage. Similarly, if the voltage at the juncture of diodes $D_5$ and $D_6$ attempts to become more negative than the voltage at terminal 12, diode $D_6$ conducts to limit the voltage across $CA_1$. As in the preceding embodiment the regulator $RE_2$ outlined in block diagram is formed of conventional circuits and functions to equate the level of voltage monitored via leads 13 and 14 across the load $R_l$ with a predetermined periodicity or rate at which the series of pulses applied to the transistor bases is presented. Thus as the voltage across the load attempts to increase, the periodicity or repetition rate of the pulses is reduced resulting in a lower voltage and vice-versa if the load voltage commences to decrease in level.

Inasmuch as the leakage inductance of the transformer serves the purpose in the aforedescribed combination, a separate bulky inductor as we have previously used in systems for the traveling wave tube amplifier combination is eliminated. Moreover, the peak current through transistors $Q_1$ and $Q_2$ in the embodiment of FIG. 1 is now $\pi/2\ I_{AV}$. This peak current is less in the ratio $(\pi/4)$ compared with the previous case. This means that the power output of the circuit may be increased in the ratio of $(4/\pi)$ or 27 percent for a given transistor rating. Moreover, transistors $Q_1$ and $Q_2$ are switched from a current-conducting to a noncurrent-conducting state only at the completion of a half sinusoid of current when the collector currents are at zero. So doing sharply reduces the power dissipation in the switching transistors to thus increase the efficiency of the DC to DC conversion. Moreover, the sinusoidal currents in $Q_1$ and $Q_2$ are changing relatively slowly avoiding the rapid transition from a high current to zero as in the case of those prior converters using a ramp-like current waveform substantially reducing generation of electromagnetic interference and because of the better operating conditions for transistors $Q_1$ and $Q_2$ the base drive circuits may be reduced in bulk and complexity. The arrangement of FIG. 3 although more complex in structure has a power capability double that of the embodiment of FIG. 1 for given transistor ratings. This is so because the transformer primary voltage is now equal to the input DC voltage whereas in the embodiment of FIG. 1 the transformer primary voltage is half the input voltage. Ideally the transformers employed make use of the winding construction of multiple stacked secondaries to reduce the effective capacitance to ground of the secondary winding and to reduce corona by applying DC instead of AC voltage across the secondary winding insulation.

An embodiment of the circuit designated $RE_1$ and $RE_2$ in FIGS. 1 and 3 is presented in block diagram form, understood by those skilled in the art, in FIG. 4 and the representative waveforms of voltages and currents, considered in connection therewith, is presented in FIG. 5.

In this circuit a resistor $R_1$ is connected in series with a resistor $R_2$ across the input terminals 3 and 4 to the circuit to form a voltage divider. A regulator REG is connected with its input at the juncture of $R_1$ and $R_2$ and its output is connected in series with a resistor $R_3$ to a first input of an And gate, $AND_1$, and to one end of capacitor $C_1$. The other end of the capacitor connected in common with input terminal 3. Regulator REG represents any conventional integrated circuit regulator commercially available, such as a type 723. A transistor, Qr, suitably an NPN type, is connected with its emitter connected in common with input 3 and its collector connected in series circuit with a resistor R4 to the first input of $AND_1$.

The circuit includes three monostable type multivibrators identified as $MONO_1$, $MONO_2$ and $MONO_3$. These monostable multivibrators are conventional logic circuit elements which have the property of producing an output representing a first stable condition and which, when triggered by an input voltage, switches the output to a second condition, unstable, in which it remains for a predetermined period of time or duration, determined by internal circuit timing elements, and then self-restores to the first stable condition. The duration of each of the multivibrators in the unstable condition is set to the individual durations which accomplishes the functions hereinafter described. Additionally, $MONO_1$ has two outputs A and $\overline{A}$ which are oppositely phased, i.e. when one output is at a voltage high the other output is at a voltage low.

The output of AND₁ is connected to the trigger input of MONO₁. The first output A of MONO₁ is connected to the trigger input of each of MONO₂ and MONO₃ and to the input of a flip-flop type multivibrator J-K. As is shown in the figure, the output of MONO₂ is connected in circuit with the second input of the And gate AND₁ and the output of MONO₃ is connected to the base of switching transistor Qr.

Flip-flop J-K is a conventional bistable conductor switch device having two stable output conditions in which it may be set or placed by input pulses, that is, a first pulse switches the device into a first condition and the next pulse switches it to the second condition. This flip-flop further contains two outputs, such as Q and $\overline{Q}$, which are oppositely phased; one is at a voltage high when the other is at a voltage low, which is also a conventional characteristic. The circuit additionally includes two conventional Nand gates, identified as NAND₁ and NAND₂. The second output $\overline{A}$ of MONO₁ is connected to a first input of each of NAND₁ and NAND₂. The first output Q of flip-flop J-K is connected to a first input of NAND₁, while the alternate output $\overline{Q}$ of J-K is connected to a first input of NAND₂. The outputs of NAND₁ and NAND₂ serve respectively as the outputs of this circuit which are connected through isolation transformers, not illustrated, to the base terminals of the switching transistors in FIG. 2.

In its operation the voltage applied across inputs 3 and 4, the inverter output voltage that is to be regulated, represented as E, is divided across resistors R₁ and R₂, and a fraction of that voltage, appearing as a voltage drop across R₂, is applied to the input of the regulator REG. REG charges the capacitor C₁ through resistor R₃. The polarities are chosen so that capacitor C₁ is charged more slowly when input voltage E is greater than a predetermined nominal level and in that situation the inverter must reduce the frequency of the inverter pulses.

In connection with this description, reference is made to the waveforms presented in FIGS. 5a through 5k. Assuming hypothetically that the level of E increases at time T₁, a voltage perturbation, the regulating action is illustrated. Thus FIG. 5a illustrates the voltage across capacitor C₁ with the voltage perturbation occurring at a time T₁. As soon as the voltage across C₁ reaches a predetermined threshold level, MONO₁ is triggered to its unstable state, assuming the output of MONO₂ is at a voltage high. FIGS. 5b and 5e represent the voltages at the outputs A and $\overline{A}$, respectively, of MONO₁, including the on time, T₂, at output A, in which MONO₁ is in the unstable output condition. In turn, MONO₂ is triggered to its unstable condition by the transition of the output A of MONO₁, the A output going from a voltage high to low, that occurs when MONO₁ resets to its first stable state. With MONO₂ switched into its unstable condition, the output C goes from a voltage high to a low for a predetermined duration T₃ as is represented in FIG. 5l. Output C of MONO₂ is applied to one input of And gate AND₁. The And gate provides a voltage high output only if both of its inputs are at a voltage high. Hence, with a voltage low at one input, And gate AND₁ cannot respond during the interval T₃ and that prevents the voltage across capacitor C₁ from retriggering MONO₁ while MONO₂ is in its unstable condition.

The result is that a minimum time is set between succeeding pulses and that minimum time is independent of both the voltage E at the input to the circuit and the voltage appearing across capacitor C₁. That action removes any possibility for turning on the second switching transistor Q₂ in the inverter of FIG. 2 before the first switching transistor Q₁ is fully turned off to avoid possible circuit damage.

The positive transitions of output A of MONO₁, at the time the voltage goes from a low to a high, triggers MONO₃ into its unstable condition for a predetermined duration T₄, represented in FIG. 5d. The output of MONO₃ forward biases transistor Qr and transistor Qr switches "on" and conducts current in a circuit including capacitor C₁ and resistor R₄ to discharge capacitor C₁. In its discharged condition C₁ is prepared for operation in the next cycle.

Positive transitions, voltage low to high, of output A of MONO₁ alternately sets and resets flip-flop J-K. The waveforms of FIGS. 5f and 5g illustrate the two outputs Q and $\overline{Q}$ of this device. Output $\overline{A}$ of MONO₁ and output Q of the flip-flop provide the two inputs to Nand gate NAND₁. With both inputs low, NAND₁ produces a positive output as illustrated in FIG. 5h. In the same fashion, output $\overline{A}$ of MONO₁ and output $\overline{Q}$ of flip-flop J-K are coupled to the two gates respectively of Nand gate NAND₂. In turn, NAND₂ provides an output at a voltage high when its two inputs are at a voltage low which output of NAND₂ is illustrated by the waveform in FIG. 5j. The outputs of the circuit taken at terminals 3 and 4 may be amplified by conventional circuit means and applied, typically through a transformer to provide DC circuit isolation, to the respective base terminals of the two inverter switch transistors of FIG. 2. This produces the inverter transformer current waveforms illustrated in FIG. 5k. As is clearly depicted in FIG. 5k, the spacing between the current pulses increases after the time of occurrance of the voltage perturbation at T₁. It is recognized that the foregoing circuit in practice preferably includes conventional means to suppress overcurrent spikes and other conventional precautions which are not illustrated in order to present this circuit in as clear a manner as is possible.

It is believed that the preceding description of the preferred embodiments of the invention is sufficient in detail to enable one skilled in the art to understand and practice the invention. However it is expressly understood that our invention is not limited to those details presented for the foregoing purpose inasmuch as many variations upon the invention, improvements, substitutions of equivalent elements may be made by one skilled in the art upon reading this specification, all of which embody the invention. Accordingly, it is expressly understood that our invention is to be broadly construed within the full spirit and scope of the appended claims.

What we claim is:

1. In a DC to DC converter the combination including:
   a transformer means, said transformer means including: a primary winding, and a secondary winding, said secondary winding being loosely coupled to said primary to provide a predetermined effective leakage inductance with respect to said primary winding;
   rectifier means connected to said secondary winding for supplying a rectified output;
   filter capacitor means coupled to the output of said rectifier means for smoothing said rectified voltage;

means for connecting an electrical load across said filter capacitor means;

second capacitor means, said second capacitor means connected in series circuit with said primary winding;

input means for receiving a DC voltage for conversion to a different DC voltage;

electronic switching means for periodically and alternately charging said second capacitor means in a first direction over a first interval of time T followed by charging said second capacitor means in a second opposite direction over a second interval of time T in a current path including said primary winding, said charging current derived from a DC voltage at said input means, said second capacitor means being sized relative to said leakage inductance of said transformer and to the impedance characteristics of said electrical load and said filter capacitor means for causing said current in said current path to have the waveform essentially of half sinusoids over a portion of each time interval;

clamping diode means coupled to said second capacitor means for limiting the level of voltage across said second capacitor means to below the level applied across said input means;

and regulating means coupled to said switching means for regulating said interval of time, T, or said periodicity as a function of voltage level monitored across said filter capacitor means for maintaining said voltage across said filter capacitor means at a constant level irrespective of the voltage variation at said input means.

2. The invention as defined in claim 1 wherein said regulating means varies said predetermined time interval, T, as a function of load voltage whereby said voltage across said load capacitor means may be varied in level relative to the voltage at said input means.

3. The invention as defined in claim 1 wherein said regulating means varies the periodicity of said charging current as a function of load voltage while maintaining the charging interval T essentially constant.

4. A DC to DC converter comprising:
a transformer having a primary winding and a secondary winding, said secondary being loosely coupled to said primary for providing an effective leakage reactance in series with said secondary winding;
first rectifier means and first filter capacitor means connected in series across said secondary;
second rectifier means and second filter capacitor means connected in series across said secondary; said first and second capacitor means having an end connected in common to one end of secondary;
and said first and second rectifier means being poled oppositely to one another for conducting current through said secondary in a first and second direction, respectively;
first and second electronic switching means;
a pair of input terminals for receiving an input DC voltage;
first pair of substantially identical capacitors connected in series across said input terminals;
diode rectifier means connected electrically in series across said input terminals and poled in the same direction;
third capacitor means connected between said two series circuits;
means connecting said midpoint of said diode series circuit to one end of said primary of said transformer;
means connecting said first switching means in circuit between said second end of said primary and one of said input terminals;
means for connecting second switching means in circuit between said second end of said primary and said second input terminal; and
control means adapted to alternately operate said first and second switching means to conduct current for predetermined periods and at a predetermined rate;
means coupled across said first and second filter capacitor means responsive to the voltage thereacross for varying the rate of said control means as in inverse function of such voltage.

5. A DC to DC converter comprising:
a transformer having at least one primary winding and at least one secondary winding, said secondary winding being magnetically coupled to said primary winding so as to have a predetermined leakage inductance therebetween and said secondary winding being center tapped;
rectifier means connected to each end of said secondary winding;
filter capacitor means;
means connecting said rectifier means to one end of said filter capacitor means and means connecting said center tap to the remaining end of said capacitor means;
second capacitor means;
input terminal means;
electronic switching means for driving a current through said primary winding and said capacitor means in series first in one direction and then in the opposite direction within a duty cycle, said current having the waveshape of a half sinusoid; diode voltage clamping means coupled to said second capacitor means for preventing the voltage on said second capacitor means from exceeding the level at said input terminal means;
whereby said current through said primary winding comprises the waveshape of half sinusoids of alternate polarity separated by an interval of zero current; and
means for monitoring the voltage across said load capacitor means for providing an output which varies the duty cycle of said electronic switching means, whereby said output voltage may be regulated against variations in input voltage.

* * * * *

UNITED STATES PATENT AND TRADEMARK OFFICE
CERTIFICATE OF CORRECTION

PATENT NO. : 4,017,784
DATED : Apr. 12, 1977
INVENTOR(S) : David Harry Simmons et al It is certified that error appears in the above-identified patent and that said Letters Patent are hereby corrected as shown below:

In Column 2, line 10, the word "he" should read -- the --.
In Column 3, line 8, "a" (1st instance) should read -- in --.
In Column 5, line 65, between "x" and "LC" insert -- √--.
In Column 6, line 21, "b" should read -- 6 --.
In Column 9, line 58, "51" should read -- 5c --.
In Column 11, line 52, between "of" and "secondary" insert -- said --.
In Column 12, line 24, "in" should read -- an --.

Signed and Sealed this thirtieth Day of August 1977

[SEAL]

Attest:

RUTH C. MASON
Attesting Officer

C. MARSHALL DANN
Commissioner of Patents and Trademarks